Dec. 30, 1952     E. JOHNSON     2,623,268
LATHE STOCK FEEDER
Filed Jan. 25, 1951     3 Sheets-Sheet 1

Inventor
ELMER JOHNSON
By Herbert A. Minturn,
Attorney

Dec. 30, 1952  E. JOHNSON  2,623,268
LATHE STOCK FEEDER
Filed Jan. 25, 1951  3 Sheets-Sheet 3

INVENTOR
ELMER JOHNSON
By Herbert A. Meinturn,
ATTORNEY

Patented Dec. 30, 1952

2,623,268

UNITED STATES PATENT OFFICE 2,623,268

LATHE STOCK FEEDER

Elmer Johnson, Shelbyville, Ind.

Application January 25, 1951, Serial No. 207,807

16 Claims. (Cl. 29—61)

This invention relates to a device for feeding bar stock through a head in a turret lathe. The device may be operated in any number of different ways, one particular way being by a suitable lever convenient to the operator of the lathe, which lever he may rock back and forth in order to obtain the desired length of stock at the particular tool then set to operate upon the bar.

A primary object of the invention is to provide a device which will be positive in its feeding operation, and at the same time will not nick or mar the stock in any way whatsoever.

A further important object of the invention is to provide a device of the nature indicated which will be easily and quickly mounted on the ordinary support bar heretofore supplied to hold the bar stock, whereby the feeder head of the device may be quickly adjusted circumferentially in respect to that support bar, as well as vertically thereof so that the required alignment of the bar stock in conjunction with the usual collet is had.

These and many other objects and advantages of the invention will become apparent to those versed in the art in the following description of one particular form of the invention which I have found to be quite serviceable, as illustrated in the accompanying drawings, in which.

A tubular spindle shaft 11 is carried in longitudinally fixed position by the lathe (not shown) to have on its outer end the lathe collet operating mechanism comprising the arms 13 and 14 carried by the collar 12 to rockably hold the operating arms 13 and 14 in the path of the arms spreader 15 floating on the spindle 11. This spreader 15 is provided with an annular groove 16 therearound into which permanently enters the finger 17 of a crosshead 18. The crosshead 18 is mounted to slide freely on the stock support bar 19. A lever 20 rockably connected to the underside of the crosshead 18 serves as means to shift the crosshead 18 along the bar 19, and consequently shift the spreader 15 along the shaft 11. The spreader 15 may be carried quite a distance to the right of the arms 13 and 14 when the stock is being fed to the lathe to be gripped by the collet 10.

Figures 7, 8, 9, 10, 11:
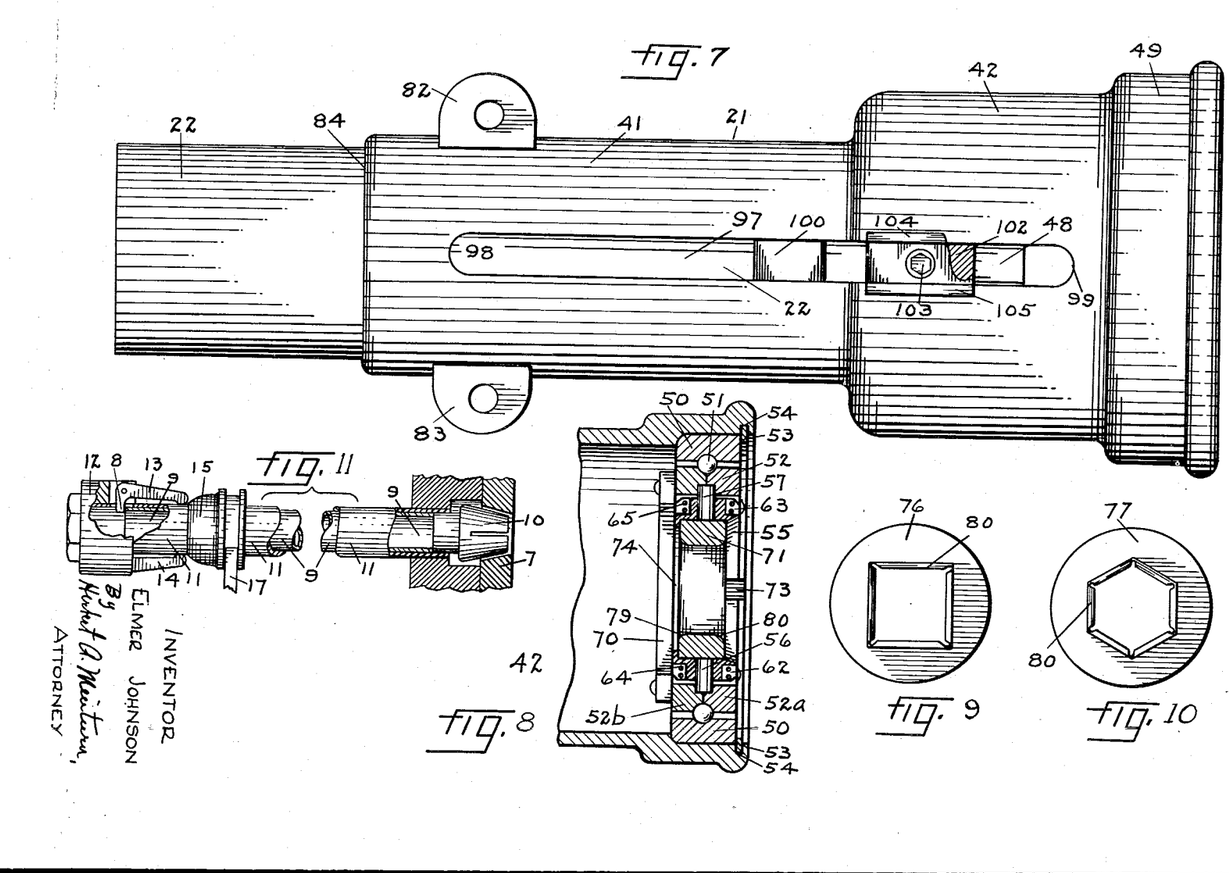
Fig. 7 is a view in bottom plan of the feeder head.
Fig. 8 is a view in transverse section on the line 8—8 in Fig. 3.
Fig. 9 is a view in front elevation of a clutch collar for rectangular stock.
Fig. 10 is a view in front elevation of a clutch collar for hexagonal stock.
Fig. 11, a detail in side elevation and partial section of a lathe spindle collet actuating mechanism, on a reduced scale.

Referring to Fig. 11, the collet 10 operates in the usual manner by having a tube 9 loosely fitting within the spindle 11 to have a foot 8 on each arm 13 and 14 extend over the outer end, and to be in the path by its other end with the collet 10 which enters by its tapered end into the wedge block 7 for contraction on the stock to be held, when the arms 13 and 14 are spread apart. All of the elements illustrated in Fig. 11 revolve in unison from the lathe drive.

So much of the structure thus far described is old in the art, and my invention is interconnected to operate therewith.

Figures 1, 2, 3:
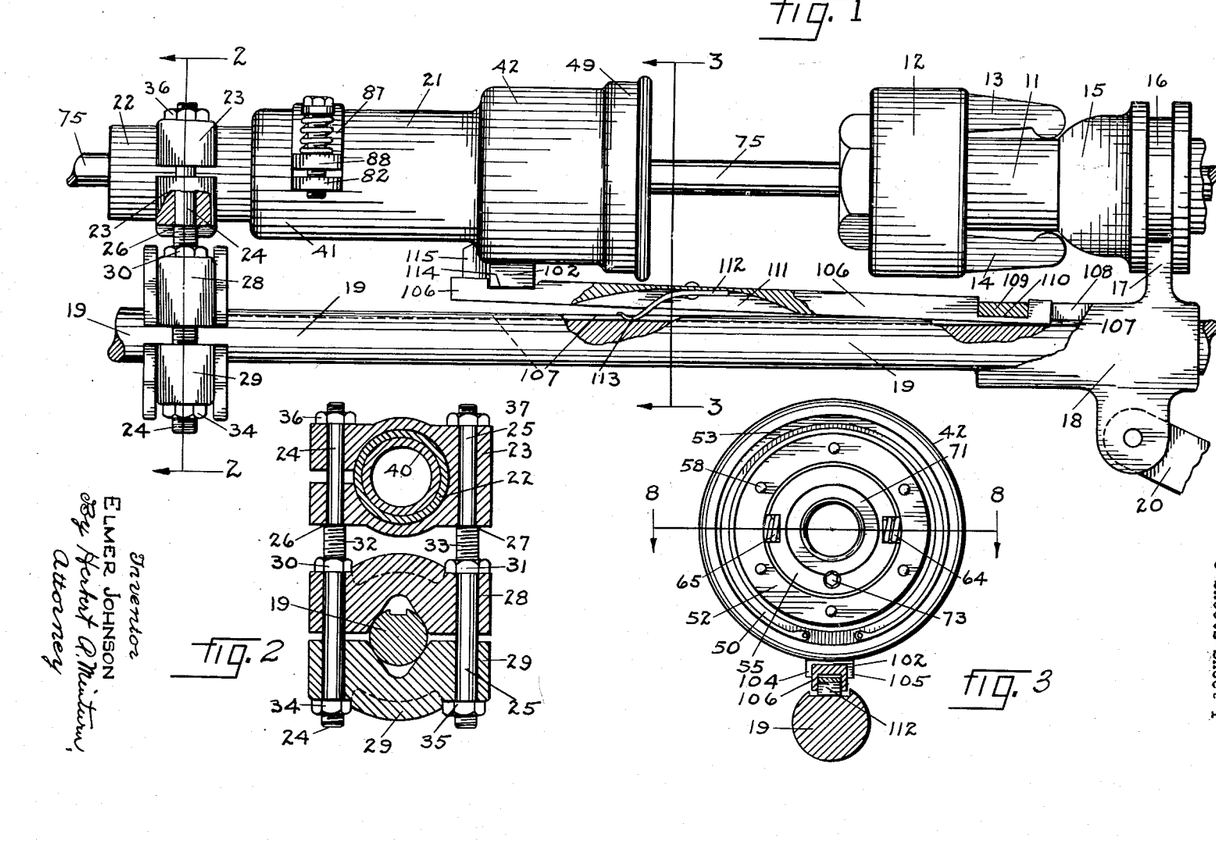
Fig. 1 is a view in side elevation of the device as mounted ready for operation, portions of the supporting and manipulating members being broken away to disclose interior parts thereof.
Fig. 2 is a view in vertical section on the line 2—2 in Fig. 1.
Fig. 3 is a view in vertical section on the line 3—3 in Fig. 1.
Figures 4, 5, 6:
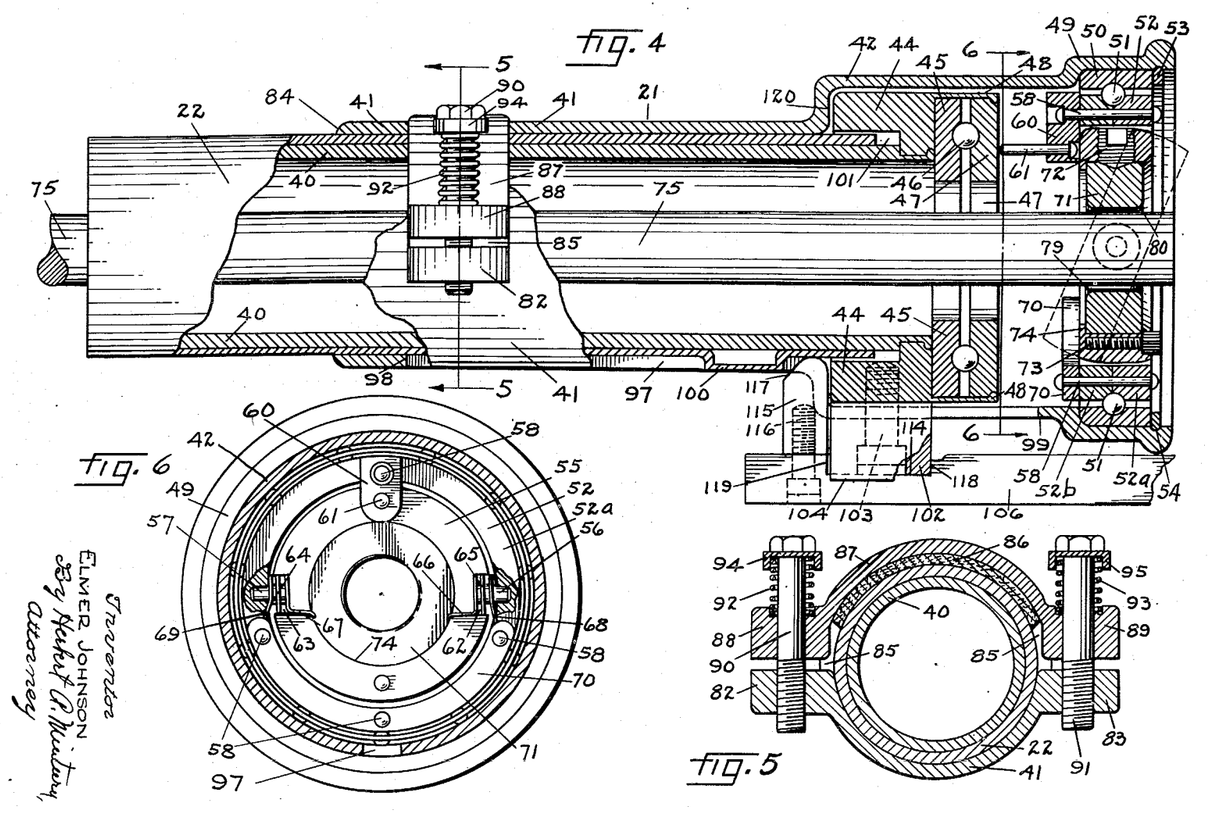
Fig. 4 is a view in side elevation and vertical longitudinal section of the feeder head of the device.
Fig. 5 is a view in vertical transverse section on the line 5—5 in Fig. 4.
Fig. 6 is a view in vertical transverse section on the line 6—6 in Fig. 4.

There is a feeder head generally designated by the numeral 21, Figs. 1, 4 and 7. This head 21 has a tube 22 extending from its rear end to serve as the head supporting member. The tube 22 is encircled by a split bracket 23, Figs. 1 and 2, which carries a pair of through bolts 24 and 25 each respectively stepped as at 26 and 27 into larger diameters outside and below the bracket 23 to be screw-threaded for a distance, and to extend downwardly through a cap 28 and a base 29.

The cap 28 is rested on top of the bar 19 with the bolts 24 and 25 extending therethrough and carrying the bracket 23 thereabove. The nuts 30 and 31 are adjusted along the threads 32 and 33 to space the bracket 23 the proper distance above the shaft 19. The base 29 is applied to the underside of the shaft or bar 19 and the lower nuts 34 and 35 are carried upwardly on the lower ends of the bolts 24 and 25 to cause the base 29 to bear against the bar 19 and pull the cap 28 downwardly thereon into clamping engagement so that the bracket 23 may thereby be adjusted circumferentially around the bar 19 as well as vertically thereabove. The bracket 23 is secured in position by drawing the top nuts 36 and 37 downwardly on the bolts 24 and 25, the nut 36 causes the bracket 23 to be squeezed into clamping engagement around the tube 22. Thus the longitudinal axis of the tube 22 is brought into parallel alignment with the longitudinal axis of the bar 19.

There is telescoped within the tube 22 the inner tube 40 with a close sliding fit. On the outside of the tube 22 there is a third tube, this tube 41 being telescoped with the tube 22 with a close sliding fit. The outer tube 41 enlarges into a bell 42 at the front end of the tube.

On the front end of the tube 40, there is secured a collar 44 which serves in one capacity as a limiting stop for the withdrawal of the tube 40 from the outer end of the tube 22. The collar 44 is secured to the end of the tube 40 in any suitable manner, herein shown as having the tube end spun over the outer face of the collar 44.

In another capacity, the collar 44 serves as an abutment for the inner race 45 which carries a series of ball bearings 46 therearound and held against the race 45 by an outer race way 47. The outer race way 47 is held in contact with the balls 46 by means of a cupped portion 48 extending as an integral part of the collar 44 around the outer peripheral portion of the race 45 and the race way 47 to be spun over the outer face of the race way 47, Fig. 4.

The bell 42 extends outwardly to have an enlarged portion 49 within which is seated a race way 50 around which is carried a plurality of ball bearings 51. An inner raceway 52 is provided to have the ball bearings 51 between it and the outer raceway 50, Figs. 4 and 8. The annular bearing thus formed is secured in place by means of a split spring washer 53 which drops within a groove 54 in the mouth of the bell portion 49 to bear against the front face of the race 50. This spring washer 53 serves as a removable keeper. A rocker carrier 55 is pivotally carried by the inner race 52 by means of the trunnion pins 56 and 57. These pins 56 and 57 extend from the carrier 55 in a common diametrical axial alignment.

The bearing raceway 52 is split into two parts 52a and 52b in order that the pins 56 and 57 may be entered into the raceway 52 for a supporting bearing. In other words the bearing for the pins 56 and 57 is divided between the two parts 52a and 52b, then the two parts are brought together and held rigidly by the through rivets 58.

A block 60 is secured against the rear face of the raceway part 52b, Figs. 4 and 6, by one of these rivets 58 passing therethrough. This block 60 extends downwardly to be in the path of the carrier 55 so that the carrier 55 is limited in its ability to rock about the axis of its pins 56 and 57, by having the upper portion of the carrier 55 come into abutment therewith as indicated in Fig. 4.

The lower portion of the block 60 carries a pin 61 horizontally slidable therethrough, to have the forward end free to come into contact with the upper portion of the carrier 55, and its rear end to be in the path of the raceway 47.

The carrier 55 is provided with a well 62 and 63 around each of the pins 56 and 57, to receive therein torsion springs 64 and 65. End portions 66 and 67 respectively of these springs 64 and 65 are carried across the back face of the carrier 55 to bear thereon, and the other ends 68 and 69 of the springs are carried over onto the back face of the raceway 52 to be secured under the ends of a counterweight 70 by means of the rivets 58. This counterweight 70 is provided to balance the rotative parts carried by the ball bearings 51 with the block 60.

The carrier 55 is provided with a circular clutch plate 71, shown in Figs. 4, 6, and 8, as having a circular opening therethrough. This plate 71 is secured within the carrier 55 by any suitable means, herein shown as by a set screw 72 enter radially through the carrier 55 to abut the peripheral portion of the plate 71, and also by a screw 73 entering the carrier 55 to have its head come into abutment with the front face of the plate 71, to retain the plate in position and against the rear flange 74 carried around the carrier 55 to abut the rear face of the plate 71.

This plate 71 has been described as having a central circular opening therethrough. The circular opening is provided when round bar stock such as the bar 75 is to be fed by the device. Where the stock is square in section a plate 76 as shown in Fig. 9 will be employed having a square opening therethrough, and should the stock take a hexagonal shape, then a flat 77 as shown in Fig. 10 will be employed. This plate 77 is provided with the six faces to correspond with the faces of the stock. In any event, these plates 71, 76, and 77, will all have the same common diameter so as to interchange one with the other and be carried selectively by the carrier 55 as the demand may be in accordance with the shape of the stock. Of course any other sectional shape of stock may be fed by the device, in which case there will be a correspondingly shaped bore through the plate carried by the carrier.

The springs 64 and 65 are so wound and so tensioned that the carrier will normally be carried to have its upper portion in abutment with the block 60, as indicated in Fig. 4, but the carrier 55 may be rocked as indicated to the dash line position, or therebeyond as shown in Fig. 4, to carry the upper portion of the carrier away from the block 60.

As will be noted in referring to Figs. 4, 8, 9, and 10, the plate 71, 76, and 77, in the respective instances, will have the marginal edges at both ends of the central bore 78 therethrough rounded as at 79 and 80, that is on both the front and rear sides. I find that the radius of the curvature at these marginal edges for a plate substantially three eighths of an inch in thickness is very satisfactory when the radius is approximately three thirty-seconds of an inch. In other words these marginal edges have a decided curvature contrary to what has been the usual practice which has been to make these edges as sharp as possible, that is the bore surface is at right angles to the front and back faces of the plate.

The tube 41 is provided with a pair of laterally extending ears 82 and 83 near its rear end 84. Above these ears 82 and 83, the tube 41 is cut through by an upper encircling slot 85.

Within this slot 85 there is carried a band of friction material 86 secured to the under side of a cap 87, this material 86 and the cap 87 serving in effect as a brake shoe. The cap 87 is provided with outturned ears 88 and 89. Cap screws 90 and 91 pass slidingly respectively through the ears 88 and 89 and screw-threadedly engage in the ears 82 and 83, Fig. 5. Surrounding the upper portions of the cap screws 90 and 91 there is in each instance a compression spring 92 and 93 herein shown as bearing by their upper ends against a cup washer 94 and 95 respectively, with the lower ends of the springs 92 and 93 bearing against the top sides of the ears 88 and 89. Therefore in running down the cap screws 90 and 91, there is a yielding pressure set up against the ears 88 and 89 which pressure in turn is conveyed to the friction material 86 bearing against the tube 22 which appears across the slot 85. This arrangement is provided to set up a braking action resisting travel of the tube 41 relative to the tube 22 which, it will be remembered, is fixed in position to be supported from the bar 19. The degree of slippage of the tube 41 in reference to the tube 22 may be varied by the compression applied through the springs 92 and 93 depending upon the positioning of the cap screws 90 and 91.

The tube 41 is provided with a central longitudinally disposed slot 97 extending from a point 98 near the rear end 84 and continuing throughout the length of the tube 41 and on through the underside of the bell 42 to a point 99 adjacent the counterweight 70, Fig. 4. The tube 22 is provided with a downwardly extending lug 100 which fits by its sides with a sliding fit within the slot 97. This lug 100 is herein shown, Figs. 4 and 7, as being an integral part of the wall of the tube 22 and drawn downwardly therefrom. This lug 100 is near the forward end of the tube 22, Fig. 4.

The collar 44 is counterbored as at 101 so that the tube 22 may be received relatively within that counterbore for a distance as indicated in Fig. 4. From the underside of the collar 44 there extends downwardly a foot 102 herein shown as rectangular in horizontal section. This foot 102 extends through the slot 97 so as to be free to slide therealong. In the form herein shown the foot 102 is a separate part from the collar 44 and is secured thereto by any suitable means, such as by the screw 103 passing upwardly through the foot 102 from its underside and screw-threadedly engaging in the collar 44. The foot 102 is provided with parallel, downwardly extending lips 104 and 105 herein shown as spaced apart the transverse width of the slot 97.

The feeder head 21 is operated by reciprocating the crosshead 18 on the support bar 19 by the interconnecting lever or link 20 which goes to the lathe. The feeder head 21 is interconnected with this crosshead 18 by means of a link bar 106, Figs. 1 and 4. The upper side of the support bar 19 is provided with a slot 107 which extends throughout its entire length, being disposed on its upper side. The cross head 18 is normally provided with an upper slot 108 to leave a solid land 109 across the front end of that slot 108 as an integral part of the cross head 18. The bar 106 is provided with a width which will permit it to slide freely by its under portion within the slot 107. The rear end of this link bar 106 is provided with a notch 110 of the length of the land 109 so that the front end portion of the link bar 106 may rest within the slot 107 by its underside, and receive the land 109 across through the slot 110 so that as the cross head 18 may be reciprocated longitudinally of the bar 19, the link bar 106 is given a likewise travel.

From the underside of the link bar 106, there is an entering slot 111 within which is fixed by one end a leaf spring 112 to have a free end 113 turned downwardly to bear against the bottom of the slot 107 in the bar 19, so that the rear end portion of the link bar 106 is normally tended to be lifted upwardly out of the slot 107 as illustrated in Fig. 1.

The rear end portion of the link bar 106 is provided with a notch 114 having a longitudinal length which will permit the bar 106 to come up into engagement with the underside of the foot 102 so that the ends of the notch 114 will form abutments on the front and back sides of the foot 102. The downturned lips 104 and 105 of the foot 102 will retain the link bar 106 against lateral displacement across the foot 102.

Immediately behind the notch 114 there is secured to the top side of the link bar 106 (it may be an integral part thereof) a finger 115, herein shown as being secured to the bar 106 by a screw 116 passing through the bar from its underside and screw-threadedly engaging in the finger 115. This finger 115 has a cam surface 117 sloping upwardly from its back side to the upper end of the finger. The front side of the finger 115 is shown to be vertically disposed. This finger 115 enters the slot 97 by its upper end normally forward of the lug 100 as indicated in Fig. 4, when the link bar 106 is seated against the underside of the foot 102 with the notch 114 engaging thereabout. The notch 114 has the front end abutment 118 and the rear end abutment 119 passing upwardly respectively on the front and back sides of the foot 102, Fig. 4. The spacing apart of these abutments 118 and 119 is slightly greater than the length of the foot 102 so that the bar 106 may be readily dropped downwardly from the foot 102 against the compression of the spring 112 without the bar 106 tending to stick in engagement with the foot 102.

*Operation*

Normally, the collar 12 and the feeder head 21 will be positioned at a greater distance apart than is indicated in the drawing, because in the drawings, these parts have been closely spaced in order to permit illustration of the parts as large as possible within the confines of the drawing sheets. That means that the link bar 106 would be correspondingly lengthened. For example, in one particular installation, I have found that a length of bar 106 as between the front side of the finger 115 and the rear side of the land 109 on the cross head 108, of approximately eleven and one-quarter inches works very satisfactorily where the collet 10 is designed to handle bar stock of from one inch in diameter and less.

To begin with, the stock bar 75 is inserted through the feeder head 21 to extend through the clutch plate 71, Fig. 4, and then on through the collet 10 (in open condition) and on through into the position at the lathe head for the cutting operations. The cross head 18 will be shifted to the left, to cause the operating surface 15 to spread apart the arms 13 and 14 to close the collet 10 and hold the stock bar 75 against longitudinal travel therethrough. The tubular shaft 11 will then be revolved in the usual and well known manner for the cutting operation.

Then for subsequent travel of the bar 75 the device of my invention comes into play. The bar 75 is to be shifted to the right. Therefore the cross head 18 will be pulled to the right by the member 20 to release the collet 10 so that the bar 75 may be free to travel therethrough. As the cross head 18 is shifted to the right, the link bar 106 then in engagement with the foot 102 under the urging of the spring 112 will pull the foot 102 to the right, to bring the raceway 47 up against the pin 61 to cause it to slide through the block 60 and in turn to rock the carrier 55 to some such position as indicated by the dash lines in Fig. 4. In this position, the rounded edges 80 on the forward top side and 79 on the under rear side will respectively be brought into engagement with the bar 75. The bar will be firmly gripped by this "cocked" position of the plate 71 without marring the bar 75 in any respect by reason of those rounded edges, but a firm engagement will be had even though the bar 75 will be greasy as it normally is. This engagement of the bar 75 will have taken place by the time the collet 10 is opened by the travel of the surface 15 out from under the fingers 13 and 14 sufficiently for that release.

The cross head 18 is then carried to the right along the support bar 19 for that distance which will cause the desired length of feed of the stock bar 75 toward the lathe. In this travel 18 after the initial engagement of the clutch plate 71 with the bar 75, the foot 102 will then carry along with it the collar 44 causing the tube 40 to follow along inside of the tube 22, and through the push on the pin 61, will carry the tube 41 on the outside of the tube 22 also therealong against the frictional resistance set up by the material 86 bearing on the tube 22 and resisting travel of the tube 41.

Thus, as long as there is forward pull on the foot 102, the plate 71 will be maintained in its engagement with the bar stock 75 because the bell 42 carrying that plate 71 will not tend to shift forward under vibration or accidentally relative to the tube 22 or the tube 40 since it is frictionally held in position.

In this travel of these various members to the right, the tube 41 travelling along over the tube 22 will then travel relative to the lug 100 engaged within the slot 97, until that lug 100 is contacted by the rear end 98 of the slot which limits the travel of the feed to the right. Normally this contact between the lug 100 and the end 98 will not be had because the desired feed will be achieved beforehand, or if it is not, then the bar 106 will be again shifted to the left and back again to the right for a subsequent feed travel.

In any event, assuming that the bar 75 has been fed to the desired right hand position, and the crosshead 18 is in its right hand position also, then the gripping of the bar 75 must be transferred from the plate 71 to the collet 10. The crosshead 18 is started on its initial left hand travel, which will bring the collet control surface 15 under the arms 13 and 14 to close the collet 12. This means that the link bar 106 is also travelling to the left, but since the tube 41 is frictionally secured in position relative to the tube 22, the plate 71 remains in its engaging position with the bar stock 75 for a slight initial travel of the foot 102 to the left, and until the collar 44 abuts the rear end of the bell 42 as at the surface 120, Fig. 4. This travel incidentally will be approximately that distance between the front face of the raceway 47 and the back face of the block 60, or at least that amount of travel which was originally set up to carry the pin 61 into the plate 71 engagement with the bar 75. By the time the collar 44 has come into contact with the surface 120, the plate 71 has released the bar 75, and the bell 42 is then started to be shifted to the left against the frictional resistance of the material 86 on the tube 22. As this travel of the tube 41 begins, the plate 71 is carried into its "uncocked" position allowing the springs 64 and 65 to return the carrier 55 to its normal upright position, so that the bar 75 is entirely released from control by the plate 71 before the collet 10 has closed into holding engagement with the bar 75.

The operation thus described is that wherein there are but short lengths of feeding of the stock 75 to the left. Where there is a longer distance of feed to be required, the crosshead 18 will initially be far to the right, so as to carry the surface 15 at a distance away from the arms 13 and 14 to permit that feeding of the stock 75 whereby there is sufficient room to bring the stock 75 along.

In this longer feeding, the operation will be as follows. The collet 10 will be open to permit free travel of the bar stock 75 therethrough, and the surface 15 will be removed a distance from the arms 13 and 14. Then the crosshead 18 is carried to the left, but without closing the collet 10, whereupon the crosshead 18 is then reversed to travel to the right to cause the plate 71 to initially be rocked into clutching engagement with the shaft 75 as above described. Then the bar 106 will be pulled to the right further to cause the tubes 40 and 41 to travel to the right in sliding relation with the fixed tube 22 whereby the collar 44 is carried some distance to the right of the front end of the tube 22, until the desired length of feed of the bar 75 has been had.

Thereafter, the crosshead 18 is then returned in a left hand travel to bring the surface 15 into the collet closing position whereby the collet 10 engages the stock 75 to hold it in the cutting operation. However prior to that collet engagement with the bar 75, the link bar 106 has started its left hand travel also, leaving the tube 41 in its extended position toward the collar 12 with the plate 71 in its locked position. The tube 41 is thus left stationary under continued travel of the link bar 106 and as the surface 15 approaches the collar 12 until the rear end of the collar 44 strikes the surface 120, after the plate 71 has been released as above described and the tube 41 also carried toward the left until the various parts reach the positions as indicated in Fig. 4.

Further travel of the link bar 106 to the left, will cause the cam surface 117 of the finger 115 to strike the lug 109 and cause the finger 115 to travel downwardly to release the link bar from engagement with the foot 102 and thus prevent any damage to the parts by continued left hand travel of the crosshead 18 as may be required to complete the closing of the collet 10 or to take care of any over-travel of the crosshead 18, in the operating linkage, and control. The friction material 86 is provided to prevent movement of the tube 41 at any time except when it is positively required such as is occasioned by travel of the link bar 106.

By reason of the fact that there is no ratchet engagement in any of the mechanism, and the entire control of the feeding of the bar 75 is under the control of travel of the tube 41, it is to be observed that a very flexible operation is to be obtained in respect to the desired or required feeding of the bar 75.

Therefore while I have described the invention in the one particular form, it is obvious that structural variations may be employed without departing from the spirit of the invention, and I therefore do not desire to be limited to that precise form beyond the limitations which may be imposed by the following claims.

I claim:

1. A bar stock feeder for a lathe having a reciprocable operating member, and a stock support bar, comprising a tubular member; means supporting the tubular member from said support bar in a relatively fixed manner; an inner tube; an outer tube; both of said tubes telescoping with said tubular member; friction means between said outer tube and said tubular member resisting travel of the outer tube along the tubular member; a stock clutch plate; a plate carrier revolubly supported by said outer tube and rockable about an axis transversely of the axis of its revolving; said plate being mounted on said carrier, having a bore therethrough conforming in contour to that of said stock, and dimensioned to receive said stock loosely therethrough; a thrust bearing carried at the end of said inner tube; a carrier rocking pin supported to revolve with said carrier and be in the path of said bearing; said inner tube having a foot member projecting laterally therefrom; said outer tube having a longitudinal slot through which said foot member may extend; a link bar engaged by one end portion with said operating member and engaged by the other end portion with said foot member; and an abutment on said inner tube in the path of said outer tube; whereby travel of the link bar may shift said inner tube to shift to rock said carrier initially to cock said plate into engagement with said stock extending through said plate bore and then continue to shift the outer tube in the one direction, and travel of the link bar in the other direction will shift said inner tube away from said carrier and cause said abutment to strike said outer tube and thereby carry both tubes along said tubular member, releasing said plate from said engagement.

2. A bar stock feeder for a lathe having a reciprocable operating member, and a stock support bar, comprising a tubular member; means supporting the tubular member from said support bar in a relatively fixed manner; an inner tube; an outer tube; both of said tubes telescoping with said tubular member; friction means between said outer tube and said tubular member resisting travel of the outer tube along the tubular member; a stock clutch plate; a plate carrier revolubly supported by said outer tube and rockable about an axis transversely of the axis of its revolving; said plate being mounted on said carrier, having a bore therethrough conforming in contour to that of said stock, and dimensioned to receive said stock loosely therethrough; a thrust bearing carried at the end of said inner tube; a carrier rocking pin supported to revolve with said carrier and be in the path of said bearing; said inner tube having a foot member projecting laterally therefrom; said outer tube having a longitudinal slot through which said foot member may extend; a link bar engaged by one end portion with said operating member and engaged by the other end portion with said foot member; and an abutment on said inner tube in the path of said outer tube; whereby travel of the link bar may shift said inner tube to shift to rock said carrier initially to cock said plate into engagement with said stock extending through said plate bore and then continue to shift the outer tube in the one direction, and travel of the link bar in the other direction will shift said inner tube away from said carrier and cause said abutment to strike said outer tube and thereby carry both tubes along said tubular member, releasing said plate from said engagement; a bearing carried by said outer tube; said carrier transverse axis being defined by diametrically disposed pins rockably carried by said outer tube bearing; and said clutch plate having rounded edges at each end of its bore to present said edges against said stock upon said cocking thereof.

3. A bar stock feeder for a lathe having a reciprocable operating member, and a stock support bar, comprising a tubular member; means supporting the tubular member from said support bar in a relatively fixed manner; an inner tube; an outer tube; both of said tubes telescoping with said tubular member; friction means between said outer tube and said tubular member resisting travel of the outer tube along the tubular member; a stock clutch plate; a plate carrrier revolubly supported by said outer tube and rockable about an axis transversely of the axis of its revolving; said plate being mounted on said carrier, having a bore therethrough conforming in contour to that of said stock, and dimensioned to receive said stock loosely therethrough; a thrust bearing carried at the end of said inner tube; a carrier rocking pin supported to revolve with said carrier and be in the path of said bearing; said inner tube having a foot member projecting laterally therefrom; said outer tube having a longitudinal slot through which said foot member may extend; a link bar engaged by one end portion with said operating member and engaged by the other end portion with said foot member; and an abutment on said innner tube in the path of said outer tube; whereby travel of the link bar may shift said inner tube to shift to rock said carrier initially to cock said plate into engagement with said stock extending through said plate bore and then continue to shift the outer tube in the one direction, and travel of the link bar in the other direction will shift said inner tube away from said carrier and cause said abutment to strike said outer tube and thereby carry both tubes along said tubular member, releasing said plate from said engagement; a lug on said tubular member presented in said slot on that side of said foot removed from approach thereto of said link bar; a cam carried by said link bar in the path of said lug and having a surface upon contacting and travelling over the lug to shift said link bar from its said engagement with said foot member.

4. A bar stock feeder for a lathe having a reciprocable operating member, and a stock support bar, comprising a tubular member; means supporting the tubular member from said support bar in a relatively fixed manner; an inner tube; an outer tube; both of said tubes telescoping with said tubular member; friction means between said outer tube and said tubular member resisting travel of the outer tube along the tubular member; a stock clutch plate; a plate carrier revolubly supported by said outer tube and rockable about an axis transversely of the axis of its revolving; said plate being mounted on said carrier, having a bore therethrough conforming in contour to that of said stock, and dimensioned to receive said stock loosely therethrough; a thrust bearing carried at the end of said inner tube; a carrier rocking pin supported to revolve with said carrier and be in the path of said bearing; said inner tube having a foot member projecting laterally therefrom; said outer tube having a longitudinal slot through which said foot member may extend; a link bar engaged by one end portion with said operating member and engaged by the other end portion with said foot member; and an abutment on said inner tube in the path of said outer tube; whereby travel of the link bar may shift said inner tube to shift to rock said carrier initially to cock said plate into engagement with said stock extending through said plate bore and then continue to shift the outer tube in the one direction, and travel of the link bar in the other direction will shift said inner tube away from said carrier and cause said abutment to strike said outer tube and thereby carry both tubes along said tubular member, releasing said plate from said engagement; a lug on said tubular member presented in said slot on that side of said foot removed from approach thereto of said link bar; a cam carried by said link bar in the path of said lug and having a surface upon contacting and traveling over the lug to shift said link bar from its said engagement with said foot member; a spring interposed between said support bar and said link bar between its said two end portions normally urging the link bar other portion rockably laterally toward said foot member; and abutments on the link bar for push-pull engagement with said foot member.

5. In a bar stock feeder for a lathe, the combination with a stock support bar, a cross head reciprocable on the bar, of a fixed tube; bracket means interconnecting said support bar and said tube to hold the tube in substantially parallel, spaced alignment with and above said bar; a second tube slidingly telescoping inside said fixed tube; an end thrust bearing carried on the front of the second tube; a third tube slidingly telescoping outside said fixed tube; a radial bearing carried at the front of the third tube; an annular carrier supported by trunnions to revolve with said radial bearing and to rock transversely of the axis of said third tube; a clutch plate mounted on said carrier; said plate having a central, axial bore therethrough corresponding by the bore face in shape to that of said bar stock; said plate having rounded corners at the junctures of the bore face and the front and back faces of the plate; a pin block carried by said radial bearing on its back side to extend by a portion into the path of said carrier; a push pin carried by said block to be slidable therein in longitudinal directions in the path of said thrust bearing; said third tube being longitudinally slotted throughout a major portion of its length; a foot carried by said second tube ahead of the fixed tube and extending through the slot of the third tube, the foot being behind said thrust bearing; and a link bar having a pair of abutments on its rear end portion spaced to receive said foot therebetween; said link bar having a forward end portion to engage with said cross head.

6. In a bar stock feeder for a lathe, the combination with a stock support bar, a cross head reciprocable on the bar, of a fixed tube; bracket means interconnecting said support bar and said tube to hold the tube in substantially parallel, spaced alignment with and above said bar; a second tube slidingly telescoping inside said fixed tube; an end thrust bearing carried on the front of the second tube; a third tube slidingly telescoping outside said fixed tube; a radial bearing carried at the front of the third tube; an annular carrier supported by trunnions to revolve with said radial bearing and to rock transversely of the axis of said third tube; a clutch plate mounted on said carrier; said plate having a central, axial bore therethrough corresponding by the bore face in shape to that of said bar stock; said plate having rounded corners at the junctures of the bore face and the front and back faces of the plate; a pin block carried by said radial bearing on its back side to extend by a portion into the path of said carrier; a push pin carried by said block to be slidable therein in longitudinal directions in the path of said thrust bearing; said third tube being longitudinally slotted throughout a major portion of its length; a foot carried by said second tube ahead of the fixed tube and extending through the slot of the third tube, the foot being behind said thrust bearing; a link bar having a pair of abutments on its rear end portion spaced to receive said foot therebetween; said link bar having a forward end portion to engage with said cross head; and friction means interposed between said fixed and third tubes yieldingly resisting relative travel therebetween.

7. In a bar stock feeder for a lathe, the combination with a stock support bar, a cross head reciprocable on the bar, of a fixed tube; bracket means interconnecting said support bar and said tube to hold the tube in substantially parallel, spaced alignment with and above said bar; a second tube slidingly telescoping inside said fixed tube; an end thrust bearing carried on the front of the second tube; a third tube slidingly telescoping outside said fixed tube; a radial bearing carried at the front of the third tube; an annular carrier supported by trunnions to revolve with said radial bearing and to rock transversely of the axis of said third tube; a clutch plate mounted on said carrier; said plate having a central, axial bore therethrough corresponding by the bore face in shape to that of said bar stock; said plate having rounded corners at the junctures of the bore face and the front and back faces of the plate; a pin block carried by said radial bearing on its back side to extend by a portion into the path of said carrier; a push pin carried by said block to be slidable therein in longitudinal directions in the path of said thrust bearing; said third tube being longitudinally slotted throughout a major portion of its length; a foot carried by said second tube ahead of the fixed tube and extending through the slot of the third tube, the foot being behind said thrust bearing; a link bar having a pair of abutments on its rear end portion spaced to receive said foot therebetween; said link bar having a forward end portion to engage with said cross head; and friction means interposed between said fixed and third tubes yieldingly resisting relative travel therebetween; and spring means normally rocking said carrier into abutment with said pin block.

8. In a bar stock feeder for a lathe, the combination with a stock support bar, a cross head reciprocable on the bar, of a fixed tube; bracket means interconnecting said support bar and said tube to hold the tube in substantially parallel, spaced alignment with and above said bar; a second tube slidingly telescoping inside said fixed tube; an end thrust bearing carried on the front of the second tube; a third tube slidingly telescoping outside said fixed tube; a radial bearing carried at the front of the third tube; an annular carrier supported by trunnions to revolve with said radial bearing and to rock transversely of the axis of said third tube; a clutch plate mounted on said carrier; said plate having a central, axial bore therethrough corresponding by the bore face in shape to that of said bar stock; said plate having rounded corners at the junctures of the bore face and the front and back faces of the plate; a pin block carried by said radial bearing on its back side to extend by a portion into the path of said carrier; a push pin carried by said block to be slidable therein in longitudinal directions in the path of said thrust bearing; said third tube being longitudinally slotted throughout a major portion of its length; a foot carried by said second tube ahead of the fixed tube and extending through the slot of the third tube, the foot being behind said thrust bearing; a link bar having a pair of abutments on its rear end portion spaced to receive said foot therebetween; said link bar having a forward end portion to engage with said cross head; and friction means interposed between said fixed and third tubes yieldingly resisting relative travel therebetween; a spring carried by said link bar to bear upon said support bar to urge said abutments upwardly toward said foot; a cam carried by said link bar back of said abutments; and a cam lug carried by said fixed tube and extending into said slot into the path of said cam; said cam having an upper, upwardly and forwardly sloping face for lug engagement to push the link bar downwardly upon travel of the cam to release said abutments from engagement with said foot.

9. In a bar stock feeder for a lathe, the combination with a stock support bar, a cross head reciprocable on the bar, of a fixed tube; bracket means interconnecting said support bar and said tube to hold the tube in substantially parallel, spaced alignment with and above said bar; a second tube slidingly telescoping inside said fixed tube; an end thrust bearing carried on the front of the second tube; a third tube slidingly telescoping outside said fixed tube; a radial bearing carried at the front of the third tube; an annular carrier supported by trunnions to revolve with said radial bearing and to rock transversely of the axis of said third tube; a clutch plate mounted on said carrier; said plate having a central, axial bore therethrough corresponding by the bore face in shape to that of said bar stock; said plate having rounded corners at the junctures of the bore face and the front and back faces of the plate; a pin block carried by said radial bearing on its back side to extend by a portion into the path of said carrier; a push pin carried by said block to be slidable therein in longitudinal directions in the path of said thrust bearing; said third tube being longitudinally slotted throughout a major portion of its length; a foot carried by said second tube ahead of the fixed tube and extending through the slot of said third tube, the foot being behind said thrust bearing; a link bar having a pair of abutments on its rear end portion spaced to receive said foot therebetween; said link bar having a forward end portion to engage with said cross head; and friction means interposed between said fixed and third tubes yieldingly resisting relative travel therebetween; said third tube having a transverse slot thereacross; and said friction means comprising a brake shoe entering said slot to bear on said fixed tube; and means carried by the third tube yieldingly maintaining the shoe on said fixed tube.

10. A bar stock feeder comprising a relatively fixed tube; a second tube telescoping within the fixed tube; a third tube telescoping outside the fixed tube; a stock clutch plate a carrier therefor pivotally mounted in said third tube to be rockable on a diametrical axis of the tube; means for longitudinally shifting said second tube relative to said fixed tube; means between said second tube and said carrier at one side thereof to cause travel of said second tube to rock said carrier and plate; and yielding friction means holding said third tube against travel while said carrier and plate are being rocked.

11. A bar stock feeder comprising a relatively fixed tube; a second tube telescoping within the fixed tube; a third tube telescoping outside the fixed tube; a stock clutch plate a carrier therefor pivotally mounted in said third tube to be rockable on a diametrical axis of the tube; means for longitudinally shifting said second tube relative to said fixed tube; means between said second tube and said carrier at one side thereof to cause travel of said second tube to rock said carrier and plate; yielding friction means holding said third tube against travel while said carrier and plate are being rocked; said friction means yielding to permit travel of the third tube along with the second tube upon continued travel thereof; and an abutment carried by said second tube to be in the path of said third tube, to permit the second tube to carry back the third tube upon reverse travel of said shifting means.

12. A bar stock feeder comprising a relatively fixed tube; a second tube telescoping within the fixed tube; a third tube telescoping outside the fixed tube; a stock clutch plate a carrier therefor pivotally mounted in said third tube to be rockable on a diametrical axis of the tube; means for longitudinally shifting said second tube relative to said fixed tube; means between said second tube and said carrier at one side thereof to cause travel of said second tube to rock said carrier and plate; yielding friction means holding said third tube against travel while said carrier and plate are being rocked; said friction means yielding to permit travel of the third tube along with the second tube upon continued travel thereof; and an abutment carried by said second tube to be in the path of said third tube, to permit the second tube to carry back the third tube upon reverse travel of said shifting means; said third tube having a longitudinal slot extending through a major length thereof; said shifting means including a foot carried by said second tube extending through said slot, said foot serving to hold the second and third tubes against relative rotation one with the other; and said fixed tube having a lug entering said slot holding the second and third tubes against rotation relatively to said fixed tube.

13. A bar stock feeder comprising a relatively fixed tube; a second tube telescoping within the fixed tube; a third tube telescoping outside the fixed tube; a stock clutch plate a carrier therefor pivotally mounted in said third tube to be rockable on a diametrical axis of the tube; means for longitudinally shifting said second tube relative to said fixed tube; means between said second tube and said carrier at one side thereof to cause travel of said second tube to rock said carrier and plate; yielding friction means holding said third tube against travel while said carrier and plate are being rocked; said friction means yielding to permit travel of the third tube along with the second tube upon continued travel thereof; and an abutment carried by said second tube to be in the path of said third tube, to permit the second tube to carry back the third tube upon reverse travel of said shifting means; said third tube having a longitudinal slot extending through a major length thereof; said shifting means including a foot carried by said second tube extending through said slot, said foot serving to hold the second and third tubes against relative rotation one with the other; and said fixed tube having a lug entering said slot holding the second and third tubes against rotation relatively to said fixed tube; said shifting means also including a link bar rockable toward and away from said foot; said link bar having thereon means to engage said foot to reciprocate it relative to said slot; and a cam member carried by said link bar in the path of said lug to kick said link bar out of said foot engagement upon a predetermined amount of said reverse travel.

14. In a bar stock feeder for a lathe, a stock engaging clutch comprising a tubular member fixed against rotation around its longitudinal axis; a radial bearing carried by said member fixed as to travel on said axis; a clutch plate having a bore to receive loosely said bar stock therethrough; said bore having an inner wall shaped to conform to the shape of said stock; said wall merging at each bore end into the front and back faces of the plate through a rounding surface; a carrier supporting said plate; means rockably mounting said carrier on said bearing to have the carrier normally free to rock on an axis normal to and intersecting said member axis; said carrier axis being fixed in respect to movement along said member axis; and an abutment carried by said bearing against which said carrier may rest in its position at approximately right angles to said member axis.

15. In a bar stock feeder for a lathe, a stock engaging clutch comprising a tubular member fixed against rotation around its longitudinal axis; a radial bearing carried by said member fixed as to travel on said axis; a clutch plate having a bore to receive loosely said bar stock therethrough; said bore having an inner wall shaped to conform to the shape of said stock; said wall merging at each bore end into the front and back faces of the plate through a rounding surface; a carrier supporting said plate; means rockably mounting said carrier on said bearing to have the carrier normally free to rock on an axis normal to and intersecting said member axis; said carrier axis being fixed in respect to movement along said member axis; and an abutment carried by said bearing against which said carrier may rest in its position at approximately right angles to said member axis; spring means yieldingly retaining said carrier against said axis; and a carrier push pin supported by said abutment to be in the path of said carrier.

16. In a bar stock feeder for a lathe, a stock engaging clutch comprising a tubular member fixed against rotation around its longitudinal axis; a radial bearing carried by said member fixed as to travel on said axis; a clutch plate having a bore to receive loosely said bar stock therethrough; said bore having an inner wall shaped to conform to the shape of said stock; said wall merging at each bore end into the front and back faces of the plate through a rounding surface; a carrier supporting said plate; means rockably mounting said carrier on said bearing to have the carrier normally free to rock on an axis normal to and intersecting said member axis; said carrier axis being fixed in respect to movement along said member axis; and an abutment carried by said bearing against which said carrier may rest in its position at approximately right angles to said member axis; spring means yieldingly retaining said carrier against said axis; and a carrier push pin supported by said abutment to be in the path of said carrier; a shiftable member within said tubular member having a bearing surface in the path of said pin; and means for moving the shiftable member to bear by said surface against said pin to effect rocking of said carrier from said abutment.

ELMER JOHNSON.

REFERENCES CITED

The following references are of record in the file of this patent:

UNITED STATES PATENTS

| Number | Name | Date |
| --- | --- | --- |
| 1,504,930 | Blanchard | Aug. 12, 1924 |
| 2,169,107 | Martin | Aug. 8, 1939 |
| 2,216,872 | Baxendale | Oct. 8, 1940 |